United States Patent
Hwang et al.

(10) Patent No.: US 10,811,732 B1
(45) Date of Patent: Oct. 20, 2020

(54) PRE-LITHIATION FOR BATTERIES HAVING SI-ANODES

(71) Applicant: Google LLC, Mountain View, CA (US)

(72) Inventors: Taisup Hwang, Santa Clara, CA (US); Ramesh C. Bhardwaj, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 223 days.

(21) Appl. No.: 15/392,066

(22) Filed: Dec. 28, 2016

(51) Int. Cl.
| | |
|---|---|
| *H01M 10/44* | (2006.01) |
| *H01M 10/0525* | (2010.01) |
| *H01M 4/38* | (2006.01) |
| *H01M 4/36* | (2006.01) |
| *H01M 4/525* | (2010.01) |
| *H01M 4/505* | (2010.01) |
| *H01M 10/42* | (2006.01) |

(52) U.S. Cl.
CPC ......... *H01M 10/446* (2013.01); *H01M 4/366* (2013.01); *H01M 4/386* (2013.01); *H01M 4/505* (2013.01); *H01M 4/525* (2013.01); *H01M 10/0525* (2013.01); *H01M 2010/4292* (2013.01)

(58) Field of Classification Search
CPC .................................................. H01M 4/366
See application file for complete search history.

(56) References Cited

U.S. PATENT DOCUMENTS

| | | | |
|---|---|---|---|
| 8,597,833 B2 | 12/2013 | Hwang et al. | |
| 2011/0052981 A1* | 3/2011 | Lopez | H01M 4/366 |
| | | | 429/206 |
| 2014/0057175 A1* | 2/2014 | Chung | H01M 4/505 |
| | | | 429/220 |
| 2014/0072874 A1* | 3/2014 | Kim | H01M 4/131 |
| | | | 429/220 |
| 2014/0087256 A1* | 3/2014 | Li | H01M 4/366 |
| | | | 429/220 |
| 2014/0272605 A1 | 9/2014 | Lim et al. | |
| 2015/0140446 A1 | 5/2015 | Li | |
| 2016/0043388 A1 | 2/2016 | Oh | |
| 2016/0149263 A1 | 5/2016 | Hallac et al. | |
| 2016/0260965 A1* | 9/2016 | Wu | H01M 4/139 |
| 2017/0207444 A1* | 7/2017 | Yanagihara | H01M 4/505 |

FOREIGN PATENT DOCUMENTS

JP 2010177042 A * 8/2010

OTHER PUBLICATIONS

Machine translation of JP 2010-177042 A (Year: 2010).*

(Continued)

*Primary Examiner* — Robert S Carrico
(74) *Attorney, Agent, or Firm* — McDonnell Boehnen Hulbert & Berghoff LLP

(57) ABSTRACT

The disclosure relates to pre-lithiation for batteries having silicon anodes. One example embodiment is a method. The method includes applying a voltage across an anode and a cathode of a battery during a formation charging process. The method also includes transferring lithium ions from the cathode to the anode to perform in situ pre-lithiation. A ratio of a capacity of the anode to a capacity of the cathode is less than 1.0.

18 Claims, 7 Drawing Sheets

(56) References Cited

OTHER PUBLICATIONS

"Ionic Liquids: Safer Solvents for Lithium-Ion Batteries?"; Christian Lawler; Submitted as coursework for PH240, Stanford University, Fall 2011; Dec. 13, 2012.
"High Rate and Stable Cycling of Lithium Metal Anode"; Jiangfeng Qian, et al.; Nature Communications 6; Article No. 6362; published Feb. 20, 2015.
"Understanding the Effect of a Fluorinated Ether on the Performance of Lithium-Sulfur Batteries"; Nasim Azimi, et al.; ACS Applied Materials & Interfaces 2015, 7, pp. 9169-6177; published Apr. 13, 2015.
"What is CC/CV mode?", retrieved from web url: http://www.bestgopower.com/faq/27-what-is-cc-cv-mode.html; retrieved Dec. 6, 2016.
"Prelithiated Silicon Nanowires as an Anode for Lithium Ion Batteries"; Nian Liu, et al.; ACS Nano, 2011, 5(8), pp. 6487-6493; published Jun. 28, 2011.
"A Dendrite-Free Lithium Anode"; Bryon Moyer; retrieved from web url: http://www.eejournal.com/archives/articles/20150521-pnnl/; published May 21, 2015.
"Battery Chargers and Charging Methods"; Electropaedia; retrieved from web url: http://www.mpoweruk.com/chargers.htm; retrieved on Dec. 6, 2016.

* cited by examiner

PRE-LITHIATION FOR BATTERIES HAVING SI-ANODES

BACKGROUND

Batteries can be used to temporarily provide electrical power to various devices when those devices are not connected to an external power source, for example. For a variety of reasons, rechargeable batteries have become increasingly prevalent in many technology areas. The lithium-ion battery is an example of a rechargeable battery.

During a first charge/discharge cycle of a lithium-ion battery, active lithium-ions may be lost within an electrolyte of the lithium-ion battery (e.g., they may intercalate into the anode in such a way that they are not retrievable). Depending on the type of anode, the amount of active lithium ion loss may be severe. For example, a silicon anode may experience a relatively high loss of lithium ions when compared with a graphite anode. When preparing a lithium-ion battery for normal use, it can be useful to pre-lithiate the anode to preempt such a loss of active lithium ions.

SUMMARY

The specification and drawings disclose embodiments that relate to pre-lithiation for batteries having silicon anodes.

In a first aspect, a method is disclosed. The method includes applying a voltage across an anode and a cathode of a battery during a formation charging process. The method also includes transferring lithium ions from the cathode to the anode to perform in situ pre-lithiation. A ratio of a capacity of the anode to a capacity of the cathode is less than 1.0.

In a second aspect, a battery is disclosed. The battery includes a cathode. The cathode includes a matrix of particles bonded with one another. Each particle includes a core region. Each particle also includes a primary shell region that surrounds the core region. Further, the battery includes an anode. The battery is configured to be charged by applying a voltage between the cathode and the anode to transfer lithium ions from the cathode to the anode.

In a third aspect, a method of in situ pre-lithiation is disclosed. The method includes applying a voltage across an anode and a cathode of a battery during a formation charging process. The method also includes transferring lithium ions from the cathode to the anode. The cathode includes a matrix of particles bonded with one another. Each particle includes a core region. Each particle also includes a primary shell region that surrounds the core region. Further, the anode includes silicon.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
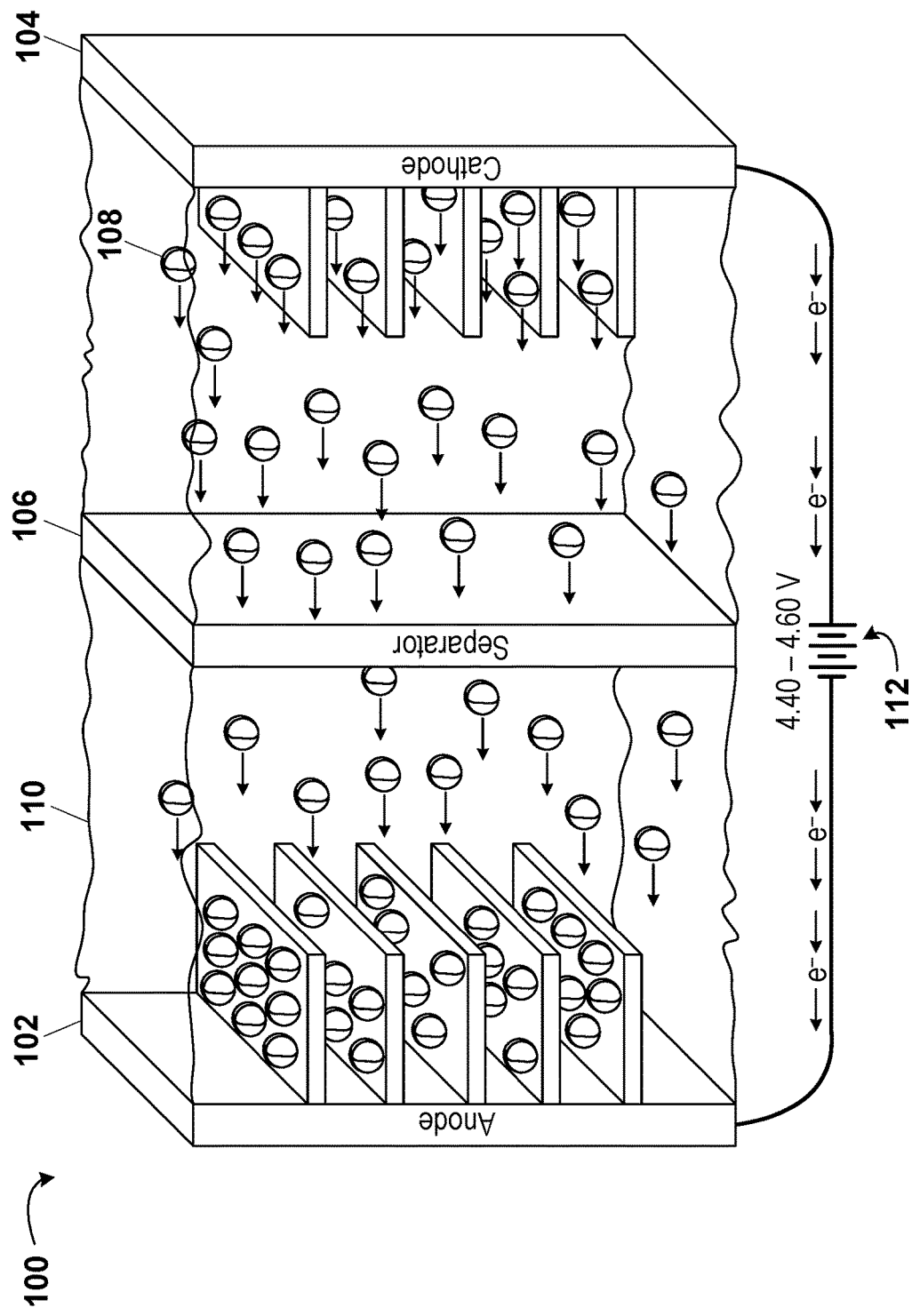
FIG. 1A is an illustration of a battery, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. OVERVIEW

Example embodiments may relate to in situ pre-lithiation for batteries having silicon anodes. Additional lithium may be initially provided on the cathode to counteract the lithium-ion loss during a first formation charge of the corresponding battery. In other words, in addition to or alternative to performing pre-lithiation prior to assembling a battery cell, the pre-lithiation may be performed during a first formation charging process after battery cell assembly, but prior to use of the battery.

One example device may include a rechargeable lithium-ion battery. The battery may have a $LiCoO_2$ cathode and a Si anode. The ratio of the capacity of the cathode to the capacity of the anode may be adjusted to a level such that the loss of active lithium ions during the first formation charge is compensated by the amount of lithium on the cathode. For example, the capacity of the cathode relative to the capacity of the anode may be increased to achieve a net reduction in lithium ion loss.

In other embodiments, the amount of lithium initially provided on the cathode before a first formation charge may be increased by modifying the chemistry of the cathode. One example modification of the cathode chemistry includes forming the cathode out of microparticles. The particles may have a core made of a first source of lithium ions, such as $LiNiCoAlO_2$ (e.g., a $LiNiCoAlO_2$ powder). The core of the particles may be surrounded by a shell. Such a shell may be made of a second source of lithium ions, such as $LiCoO_2$.

In alternate embodiments, the cathode may include microparticles having a three-tiered structure (e.g., a core, a first shell surrounding the core, and a second shell surrounding the first shell). Each of the parts of the particles may also be sources of lithium ions. As one possible example, the core may be made of $LiCoO_2$, the first shell may be made of $LiNiCoAlO_2$, and the second shell may be made of $Li_2MnO_3$.

Across various embodiments, the chemical composition of the cathode may represent design choices that decrease chemical stability as a tradeoff for increased lithium capacity, or vice versa. Further, across various embodiments, the voltages used for the first formation charge may vary to optimize the amount of lithium transferred from cathode to anode during the first formation charge. In some embodiments, such as those embodiments having a cathode made of particles with multiple layers, the voltages used for the first formation charge may be higher than alternate embodiments, for example.

In still other embodiments, the cathode may be made of particles having four or more different materials (e.g., a core with three or more shells). A ratio of the core size to the shell(s) size(s) may vary across embodiments to control an amount of available lithium ions for extraction from the cathode. In addition to or as an alternative to silicon, some embodiments may have anodes made of other materials.

Alternative methods for pre-lithiation of batteries having silicon anodes may include electro-chemical processes, physical processes (e.g., using stabilized lithium-metal powders), or vacuum, thermal processes. Unlike those methods, a production of batteries according to the methods presented herein might not require a dry room, an argon gas supply, an electrolyte bath, or a time-consuming batch process.

II. EXAMPLE DEVICES

FIG. 1A is an illustration of a battery 100. The battery 100 may be a lithium-ion, rechargeable battery, for example. The battery 100 may include an anode 102, a cathode 104, a separator 106, and free lithium ions 108 within an electrolyte 110. Further, as illustrated in FIG. 1A, the battery may be chargeable by a power source 112 (e.g., a rectified alternating current, AC, signal; a separate charged battery; or a charged capacitor). In some embodiments, multiple cells of cathode, anode, separator, and electrolyte may be electrically arranged in series and/or parallel to form the battery. Such cell arrangements may enhance the capacity and/or voltage of the battery.

Charging may include electrons flowing from the cathode 104 to the anode 102 through circuitry external to the battery 100. In addition, charging may include free lithium ions 108, within the electrolyte solution 110, flowing from the cathode 104 to the anode 102 through the separator 106. Further, charging may include the free lithium ions 108 being intercalated into the anode 102. Such a process is illustrated in FIG. 1A by the lithium ions that are sitting on "shelves" of the anode 102. The charging may represent a first formation charging process (e.g., occurring at a direct current, DC, voltage between 4.40 volts and 4.60 volts). The first formation charging process may last between 10 hours and 20 hours, in some embodiments. Additionally, the battery 100 may be configured to undergo repeated charge/discharge cycles during a lifetime of the battery 100 (e.g., be charged to between 4.35 volts and 4.45 volts and then discharged).

The anode 102 may be the negative terminal (electrode) of the battery 100. For example, the anode 102 may include one or more external electrical contacts on the side of the anode 102 facing away from the separator 106. The external electrical contact(s) may allow an electrical connection between the anode 102 and the power source 112 or a load to be made. The anode 102 may include Si, in some embodiments.

The cathode 104 may be the positive terminal (electrode) of the battery 100. For example, the cathode 104 may include one or more external electrical contacts on the side of the cathode 104 facing away from the separator 106. The external electrical contact(s) may allow an electrical connection between the cathode 104 and the power source 112 or a load to be made. The cathode 104 may include $LiCoO_2$, in some embodiments.

As illustrated, the relative sizes of the cathode 104 and the anode 102 may be approximately equal. In some embodiments, a capacity of the cathode 104 (e.g., a storage capacity for holding lithium ions) may be greater than a capacity of the anode 102 (e.g., a storage capacity for holding lithium ions). For example, the ratio of the capacity of the anode 102 to the capacity of the cathode 104 may be at most 1.0. If the battery 100 has a cathode 104 with a lithium storage capacity greater than the lithium storage capacity of the anode 102, in situ pre-lithiation may occur during a first formation charging process. Such pre-lithiation may prevent low coulombic efficiency, loss of lithium ions, solid-electrolyte interphase (SEI) formation, and/or capacity loss during the life of the battery 100 (i.e., after multiple charge/discharge cycles of the battery 100). That is, pre-lithiation may increase the amount of available lithium ions in the battery, which may improve battery efficiency, battery lifetime, etc. In various other embodiments, the ratio of the capacity of the anode 102 to the capacity of the cathode 104 may be 0.999, 0.99, 0.98, 0.97, 0.96, 0.95, 0.9, 0.85, 0.8, 0.75, or 0.7.

The separator 106 may prevent a short circuit of the cathode 104 to the anode 102 within the battery 100. For example, the separator 106 may include a semi-permeable membrane (e.g., permeable to the free lithium ions 108). To achieve such semi-permeability, the separator 106 may include micropores that are sized to selectively allow the passage of the free lithium ions 108 during charging or discharging processes. The semi-permeable membrane of the separator 106 may also have an amorphous or a semi-crystalline structure. Further, the semi-permeable membrane of the separator 106 may be polymeric (e.g., fabricated from cellulose acetate, nitrocellulose, cellulose esters, polysulfone, polyether sulfone, polyacrilonitrile, polyamide, polyimide, polyethylene, polypropylene, polytetrafluoroethylene, polyvinylidene fluoride, and/or polyvinylchloride). In addition, the separator 106 may be chemically and electrochemically stable for use within the battery 100 during charging and discharging processes. In some embodiments, the separator 106 may include a multi-layered structure.

The free lithium ions 108 may transfer between the anode 102 and the cathode 104 during charging/discharging processes of the battery 100. In some embodiments, the free lithium ions 108 may originate from the cathode 104. For example, the cathode 104 may include $LiCoO_2$, which may be a source of free lithium during the chemical reactions occurring during the charging process (e.g., during the first formation charging process). Other sources of free lithium ions, such as from the anode and/or from dissolving lithium salts (e.g., $LiPF_6$, $LiBF_4$, or $LiClO_4$) within the electrolyte 110, are also possible.

The electrolyte 110 may include a medium through which the free lithium ions 108 travel during charging and discharging processes of the battery 100. The electrolyte 110 may be a gel or a liquid, in various embodiments and/or at various temperatures. For example, the electrolyte 110 may be an organic solvent (e.g., ethylene carbonate, dimethyl carbonate, or diethyl carbonate). Other additives may be included within the electrolyte 110 to enhance the effectiveness of the electrolyte 110. In some embodiments, for instance, ionic liquids may be included within the electrolyte to reduce volatility of the electrolyte solution.

Figure 1B:
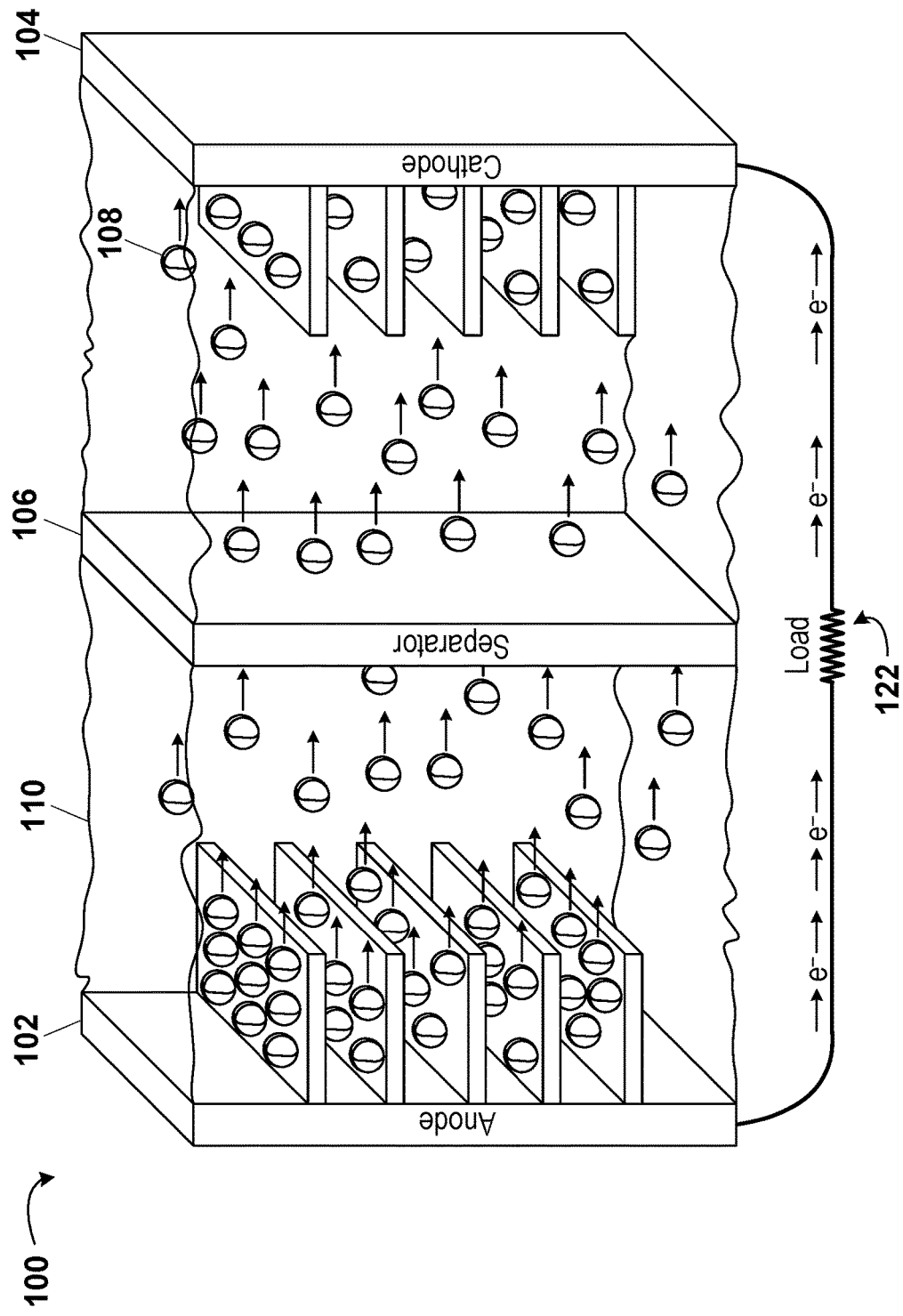
FIG. 1B is an illustration of a battery, according to example embodiments.

FIG. 1B is another illustration of the battery 100. The battery 100 illustrated in FIG. 1B may be discharging across a load 122. Discharging the battery 100 may include electrons flowing from the anode 102 to the cathode 104, across the load 122, through circuitry external to the battery 100. Discharging the battery 100 may also include the free lithium ions 108 within the electrolyte solution 110 flowing from the anode 102 to the cathode 104 through the separator 106. Further, discharging the battery may include the free lithium ions 108 being intercalated into the cathode 104. Such a scenario is illustrated in FIG. 1B by the lithium ions that are sitting on "shelves" of the cathode 104.

The load 122 may be a device powered by the battery 100, such as an electric vehicle, a hybrid electric vehicle, a mobile device, a tablet computing device, a laptop computing device, a light source, television remote, headphones, etc. The load 122 may be powered by the flow of electrons through the circuitry external to the battery 100 during the discharging process, for example.

Figure 2A:
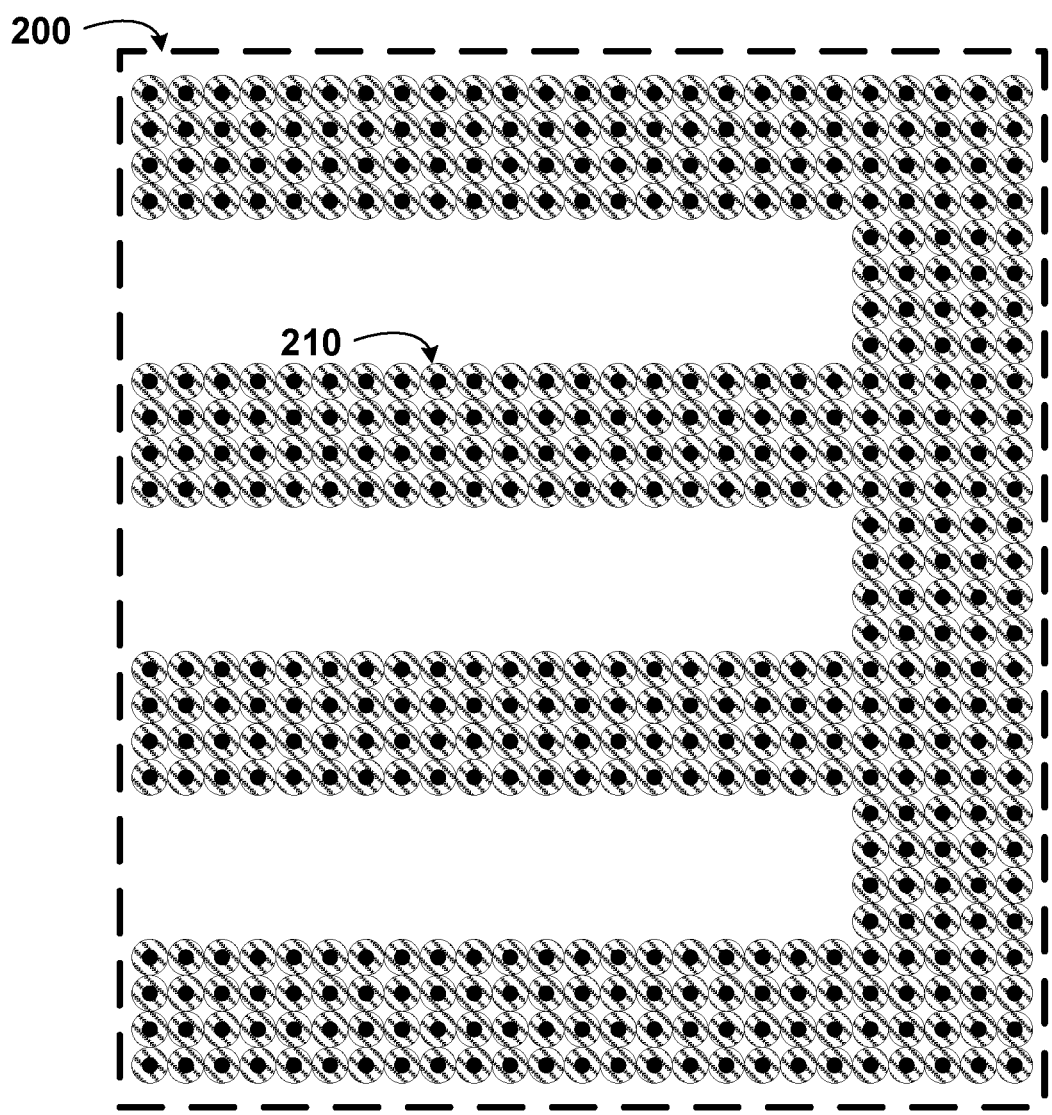
FIG. 2A is an illustration of a cathode, according to example embodiments.

FIG. 2A is an illustration of a cathode 200, according to example embodiments. The cathode 200 could be used in place of the cathode 104 illustrated in FIGS. 1A and 1B, in some embodiments. Alternatively, the cathode 200 may be used in batteries having alternate geometries and/or chemistries (e.g., different electrolyte chemistries). In any case, the cathode 200 may be used in a battery having a silicon anode. The cathode 200 may provide for in situ pre-lithiation, thus preventing certain forms of degradation in batteries (e.g., batteries having silicon anodes). Further, the cathode 200 may be used in a rechargeable battery that is configured to be repeatedly recharged (e.g., at a voltage between 4.15 volts and 4.25 volts).

In addition, the battery housing the cathode 200 may be configured to be charged during a first formation charging process (e.g., at a voltage between 4.45 volts and 4.50 volts). The first formation charging process may last between 10 hours and 20 hours, in some embodiments. Higher voltages used for the first formation charging process may correspond to greater amounts of lithium extraction from the cathode 200. For example, a first formation charging voltage between 4.45 volts and 4.50 volts may result in a lithium ion extraction from the cathode 200 that is approximately 10% greater than the lithium ion extraction from the cathode 200 at a first formation charging voltage between 4.35 volts and 4.40 volts.

The cathode 200 illustrated in FIG. 2A includes multiple microparticles 210. The microparticles 210 may be between 5 μm and 10 μm in diameter, in some embodiments. As illustrated, the microparticles 210 may be arranged in an ordered fashion. The structure created by the arrangement of the microparticles 210 may be crystalline or semi-crystalline. Further, the structure may, as illustrated in FIG. 2A, have regions allowing for the intercalation of lithium ions during charging and/or discharging processes. The structure of the cathode 200 illustrated in FIG. 2A is provided solely as an example; it does not necessarily reflect actual shapes or sizes of the microparticles 210 or the cathode 200. Other structures are also possible.

Figure 2B:
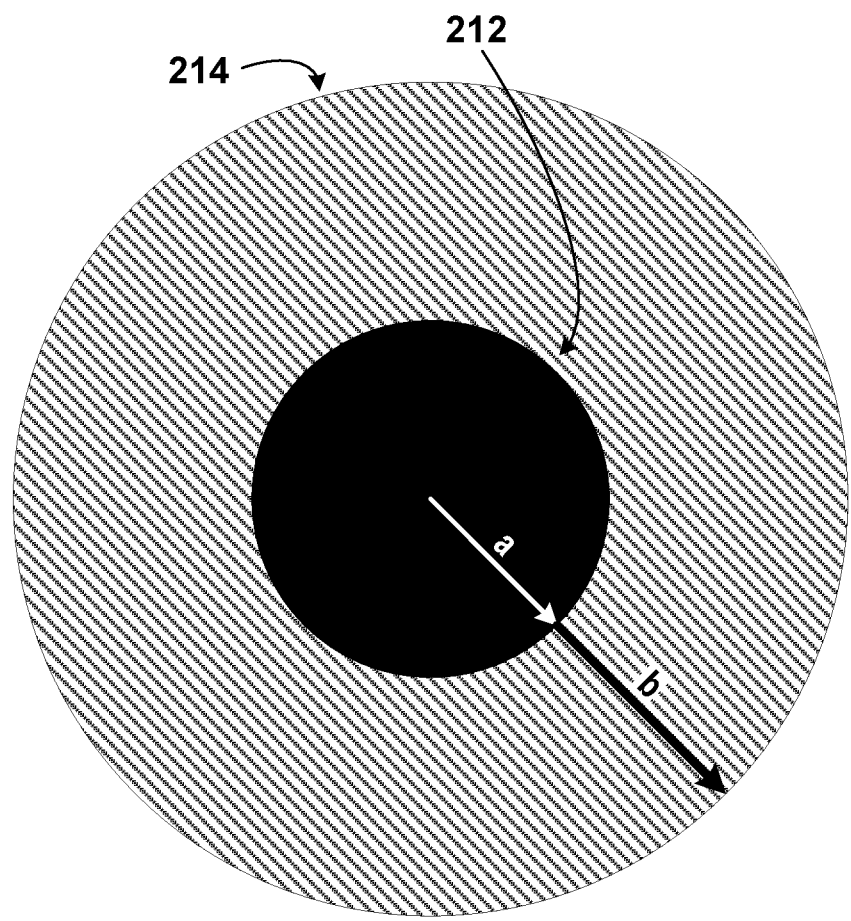
FIG. 2B is an illustration of a cathode particle, according to example embodiments.

FIG. 2B is an illustration of one of the microparticles 210 of the cathode 200 illustrated in FIG. 2A (e.g., a cross-section of the microparticle 210). As illustrated, the microparticle 210 may include a core region 212 and a primary shell region 214 that surrounds the core region 212. The core/shell geometry may be chemically stable.

As illustrated, the microparticles 210 may be substantially spherical. Other shapes of the microparticles 210 are also possible. Further, the microparticles 210 may be in a powdered form. The powdered microparticles 210 may then be chemically or otherwise bonded (e.g., annealed) to form the cathode 200 illustrated in FIG. 2A.

The core region 212 may have a radius of "a", and the primary shell region 214 may have a thickness of "b" (e.g., the thickness representing the radius of the primary shell region 214 minus the radius of the core region 212).

The ratio of "a" to "b" (i.e., of the radius of the core region 212 to the thickness of the primary shell region 214) may be between 0.1 and 0.5 (e.g., 0.3), in some embodiments. In alternate embodiments, the ratio may be between 0.001 and 0.009 (e.g., 0.005), between 0.01 and 0.09 (e.g., 0.05), 0.5 and 1.0 (e.g., 0.75), between 0.9 and 1.1 (e.g., 1.0), or between 1.0 and 3.0 (e.g., 2.0). Other ratios are also possible.

The core region 212 may include $LiNiCoAlO_2$. The $LiNiCoAlO_2$ may provide a source of free lithium ions during a first formation charge, for example. The free lithium ions may be used for in situ pre-lithiation, in some embodiments. In alternate embodiments, the core region may include multiple lithium-containing compounds. For example, the core region may include $LiNiCoAlO_2$ and $Li_2MnO_3$.

The primary shell region 214 may include $LiCoO_2$. The $LiCoO_2$ may provide an additional source of free lithium ions during a first formation charge. Similar to the free lithium from the core region 212, the free lithium ions may be used for in situ pre-lithiation, in some embodiments. In alternate embodiments, the primary shell region may include multiple lithium-containing compounds. For example, the primary shell region may include $LiNiMnCoO_2$ and $Li_2MnO_3$.

Figure 3:
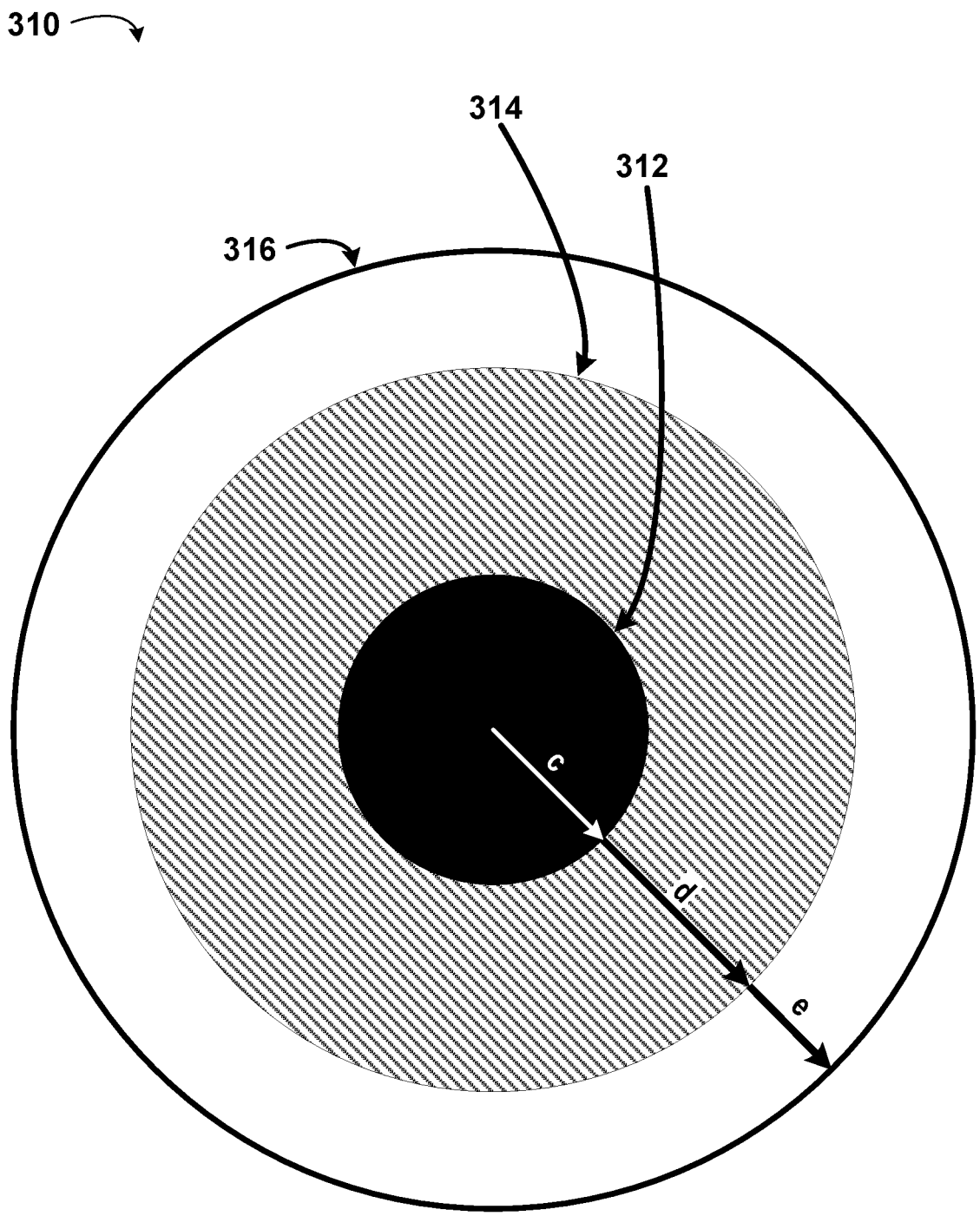
FIG. 3 is an illustration of a cathode particle, according to example embodiments.

FIG. 3 is an illustration of a microparticle 310, according to some embodiments (e.g., a cross-section of the microparticle 310). The microparticle 310 may be arranged with other similar microparticles to form a cathode of a battery. Such a cathode may be similar to the cathode 200 illustrated in FIG. 2A. In other embodiments, such a cathode may be amorphous, or have other structural features not illustrated in the cathode 200 of FIG. 2A. Further, such a cathode may be used in batteries having alternate chemistries (e.g., different electrolyte chemistries than the cathode 200 of FIG. 2A). In any case, such a cathode may be used in a battery having a silicon anode. Further, the microparticles 310 may allow such a cathode to provide for in situ pre-lithiation, thus preventing certain forms of degradation in batteries (e.g., batteries having silicon anodes).

Further, a cathode that is fabricated from the microparticles 310 illustrated in FIG. 3 may be used in a rechargeable battery that is configured to be repeatedly recharged (e.g., at a voltage between 4.15 volts and 4.25 volts). In addition, a cathode that is fabricated from the microparticles 310 illustrated in FIG. 3 may be used in a battery that is configured to be charged during a first formation charging process (e.g., at a voltage between 4.45 volts and 4.50 volts). The first formation charging process may last between 10 hours and 20 hours, in some embodiments. Higher voltages used for the first formation charging process may correspond to greater amounts of lithium extraction from a cathode fabricated from the microparticles 310. For example, a first formation charging voltage between 4.45 volts and 4.50 volts may result in a lithium ion extraction that is approximately 10% greater than the lithium ion extraction at a first formation charging voltage between 4.35 volts and 4.40 volts.

As illustrated, the microparticle 310 may include a core region 312, a primary shell region 314 that surrounds the core region 312, and a secondary shell region 316 that surrounds the primary shell region 314. The core/shell/shell geometry may be chemically stable or chemically unstable, in various embodiments. For example, the core/shell/shell geometry may be chemically unstable when used at a high voltage due to transition metal dissolution.

Also as illustrated, the microparticle 310 may be substantially spherical. Other shapes of the microparticle 310 are also possible. Further, the microparticle 310 may be in a powdered form. The powdered microparticle 310 may then be chemically or otherwise bonded (e.g., annealed) with other microparticles to form a cathode (e.g., similar to the cathode 200 illustrated in FIG. 2A).

The core region 312 may have a radius of "c", the primary shell region 314 may have a thickness of "d" (e.g., the thickness representing the radius of the primary shell region 314 minus the radius of the core region 312), and the secondary shell region 316 may have a thickness "e" (e.g., the thickness representing the radius of the secondary shell region 316 minus the thickness of the primary shell region 314 and the radius of the core region 312).

The ratio of "c" to "d" (i.e., of the radius of the core region 312 to the thickness of the primary shell region 314) may be between 0.01 and 0.5 (e.g., 0.3), in some embodiments. In alternate embodiments, the ratio may be between 0.001 and 0.009 (e.g., 0.005), between 0.01 and 0.09 (e.g., 0.05), 0.5 and 1.0 (e.g., 0.75), between 0.9 and 1.1 (e.g., 1.0), or between 1.0 and 3.0 (e.g., 2.0). Other ratios are also possible.

Further, the ratio of "d" to "e" (i.e., of the thickness of the primary shell region 314 to the thickness of the secondary shell region 316) may be between 0.01 and 0.5 (e.g., 0.3), in some embodiments. In alternate embodiments, the ratio may be between 0.001 and 0.009 (e.g., 0.005), between 0.01 and 0.09 (e.g., 0.05), 0.5 and 1.0 (e.g., 0.75), between 0.9 and 1.1 (e.g., 1.0), or between 1.0 and 3.0 (e.g., 2.0). Other ratios are also possible.

The core region 312 may include $LiCoO_2$. The $LiCoO_2$ may provide a source of free lithium ions during a first formation charge, for example. The free lithium ions may be used for in situ pre-lithiation, in some embodiments.

The primary shell region 314 may include $LiNiMnCoO_2$. The $LiNiMnCoO_2$ may provide an additional source of free lithium ions during a first formation charge. Similar to the free lithium from the core region 312, the free lithium ions may be used for in situ pre-lithiation, in some embodiments.

The secondary shell region 316 may include $Li_2MnO_3$. The $Li_2MnO_3$ may provide an additional source of free lithium ions during a first formation charge. Similar to the free lithium from the core region 312 and the primary shell region 314, the free lithium ions may be used for in situ pre-lithiation, in some embodiments.

Figure 4:
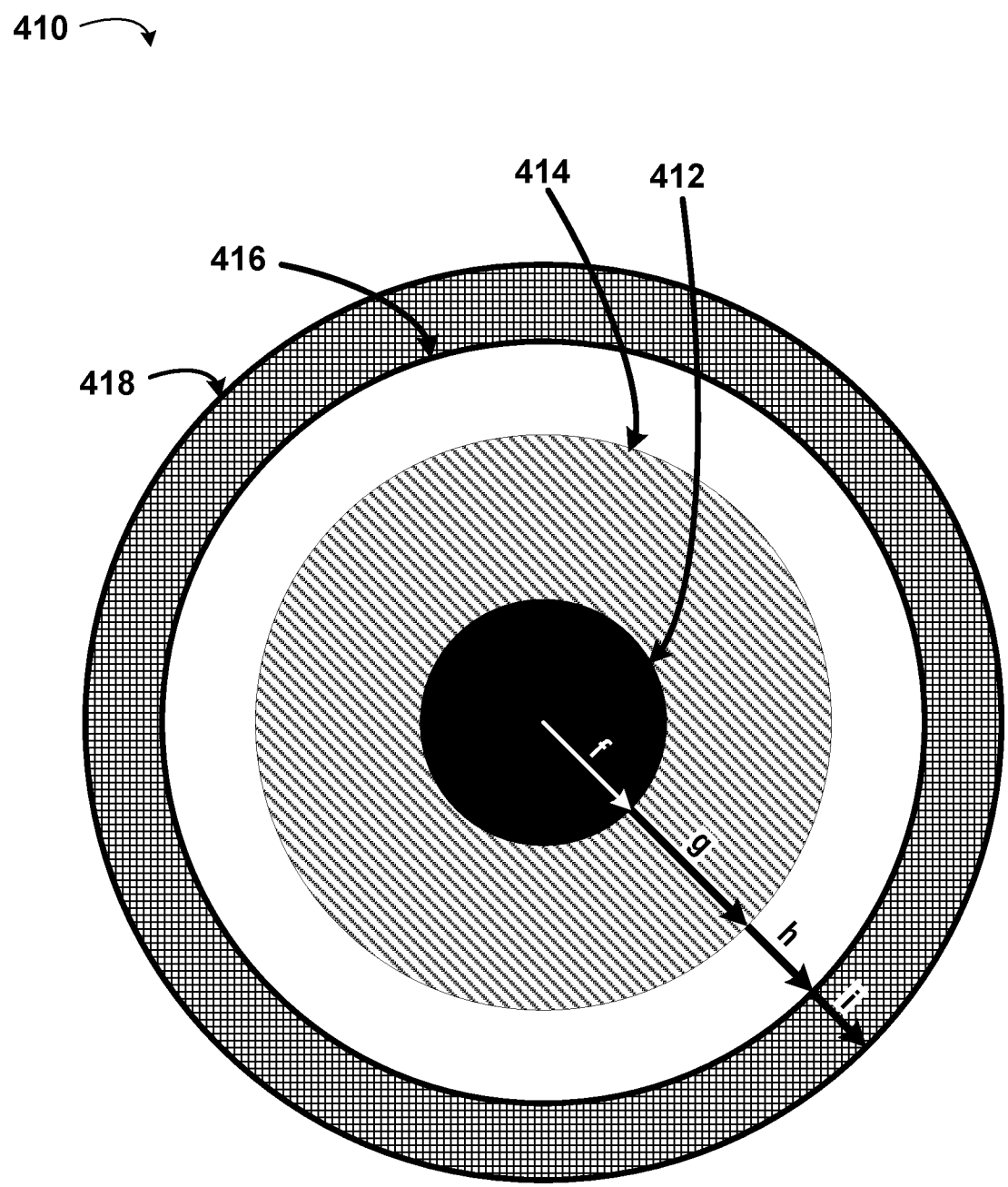
FIG. 4 is an illustration of a cathode particle, according to example embodiments.

FIG. 4 is an illustration of a microparticle 410, according to some embodiments (e.g., a cross-section of the microparticle 410). The microparticle 410 may be arranged with other similar microparticles to form a cathode of a battery. Such a cathode may be similar to the cathode 200 illustrated in FIG. 2A. In other embodiments, such a cathode may be amorphous, or have other structural features not illustrated in the cathode 200 of FIG. 2A. Further, such a cathode may be used in batteries having alternate chemistries (e.g., different electrolyte chemistries than the cathode 200 of FIG. 2A). In any case, such a cathode may be used in a battery having a silicon anode. Further, the microparticles 410 may allow such a cathode to provide for in situ pre-lithiation, thus preventing certain forms of degradation in batteries (e.g., batteries having silicon anodes).

Further, a cathode that is fabricated from the microparticles 410 illustrated in FIG. 4 may be used in a rechargeable battery that is configured to be repeatedly recharged (e.g., at a voltage between 4.15 volts and 4.25 volts). In addition, a cathode that is fabricated from the microparticles 410 illustrated in FIG. 4 may be used in a battery that is configured to be charged during a first formation charging process (e.g., at a voltage between 4.45 volts and 4.50 volts). The first formation charging process may last between 10 hours and 20 hours, in some embodiments. Higher voltages used for the first formation charging process may correspond to greater amounts of lithium extraction from a cathode fabricated from the microparticles 410. For example, a first formation charging voltage between 4.45 volts and 4.50 volts may result in a lithium ion extraction that is approximately 10% greater than the lithium ion extraction at a first formation charging voltage between 4.35 volts and 4.40 volts.

As illustrated, the microparticle 410 may include a core region 412, a primary shell region 414 that surrounds the core region 412, a secondary shell region 416 that surrounds the primary shell region 414, and a tertiary shell region 418 that surrounds the secondary shell region 416. The core/shell/shell/shell geometry may be chemically stable or chemically unstable, in various embodiments.

Also as illustrated, the microparticle 410 may be substantially spherical. Other shapes of the microparticle 410 are also possible. Further, the microparticle 410 may be in a powdered form. The powdered microparticle 410 may then be chemically or otherwise bonded (e.g., annealed) with other microparticles to form a cathode (e.g., similar to the cathode 200 illustrated in FIG. 2A).

The core region 412 may have a radius of "f". The primary shell region 414 may have a thickness of "g" (e.g., the thickness representing the radius of the primary shell region 414 minus the radius of the core region 412). The secondary shell region 416 may have a thickness "h" (e.g., the thickness representing the radius of the secondary shell region 416 minus the thickness of the primary shell region 414 and the radius of the core region 412). The tertiary shell region 418 may have a thickness "i" (e.g., the thickness representing the radius of the tertiary shell region 418 minus the thickness of the secondary shell region 416, the thickness of the primary shell region 414, and the radius of the core region 412).

The ratio of "f" to "g" (i.e., of the radius of the core region 412 to the thickness of the primary shell region 414) may be between 0.01 and 0.5 (e.g., 0.3), in some embodiments. In alternate embodiments, the ratio may be between 0.001 and 0.009 (e.g., 0.005), between 0.01 and 0.09 (e.g., 0.05), 0.5 and 1.0 (e.g., 0.75), between 0.9 and 1.1 (e.g., 1.0), or between 1.0 and 3.0 (e.g., 2.0). Other ratios are also possible.

Further, the ratio of "g" to "h" (i.e., of the thickness of the primary shell region 414 to the thickness of the secondary shell region 416) may be between 0.01 and 0.5 (e.g., 0.3), in some embodiments. In alternate embodiments, the ratio may be between 0.001 and 0.009 (e.g., 0.005), between 0.01 and 0.09 (e.g., 0.05), 0.5 and 1.0 (e.g., 0.75), between 0.9 and 1.1 (e.g., 1.0), or between 1.0 and 3.0 (e.g., 2.0). Other ratios are also possible.

In addition, the ratio of "h" to "i" (i.e., of the thickness of the secondary shell region 416 to the thickness of the tertiary shell region 418) may be between 0.01 and 0.5 (e.g., 0.3), in some embodiments. In alternate embodiments, the ratio may be between 0.001 and 0.009 (e.g., 0.005), between 0.01 and 0.09 (e.g., 0.05), 0.5 and 1.0 (e.g., 0.75), between 0.9 and 1.1 (e.g., 1.0), or between 1.0 and 3.0 (e.g., 2.0). Other ratios are also possible.

The core region 412 may include $LiCoO_2$ (or some alternate compound that yields free lithium during charging). The $LiCoO_2$ may provide a source of free lithium ions during a first formation charge, for example. The free lithium ions may be used for in situ pre-lithiation, in some embodiments.

The primary shell region 414 may include $LiNiMnCoO_2$ (or some alternate compound that yields free lithium during charging). The $LiNiMnCoO_2$ may provide an additional source of free lithium ions during a first formation charge. Similar to the free lithium from the core region 412, the free lithium ions may be used for in situ pre-lithiation, in some embodiments.

The secondary shell region 416 may include $Li_2MnO_3$ (or some alternate compound that yields free lithium during charging). The $Li_2MnO_3$ may provide an additional source of free lithium ions during a first formation charge. Similar to the free lithium from the core region 412 and the primary shell region 414, the free lithium ions may be used for in situ pre-lithiation, in some embodiments.

The tertiary shell region 418 may include $LiNiCoAlO_2$ (or some alternate compound that yields free lithium during charging). The $LiNiCoAlO_2$ may provide an additional source of free lithium ions during a first formation charge. Similar to the free lithium from the core region 412, the primary shell region 414, and the secondary shell region 416, the free lithium ions may be used for in situ pre-lithiation, in some embodiments.

As illustrated in FIGS. 2A/2B, FIG. 3, and FIG. 4, respectively, microparticles having a core/shell, core/shell/shell, or core/shell/shell/shell geometry may be used to form the cathode in various embodiments. In alternate embodiments, additional shells may be included. For example, the microparticles used to form the cathode may have five, ten, or twenty shells, in various embodiments. The chemical stability may decrease as the number of shells is increased. However, the amount of free lithium contributed during an in situ pre-lithiation process may increase with an increase in the number of shells.

The core and/or shells in embodiments having multiple shells may include compounds that have free lithium sources for in situ pre-lithiation, including, but not limited to: $LiCoO_2$, $LiNiMnCoO_2$, $Li_2MnO_3$, and $LiNiCoAlO_2$. Such compounds may be used in various combinations in various layers, in various embodiments. For example, in some embodiments, the same compound may be used in multiple layers (e.g., the core and the outermost shell may both include $LiCoO_2$). Further, rather than having discrete layers (e.g., core, primary shell region, secondary shell region, etc.), some embodiments may have one or more gradients of various compounds from the center of the particles to the edge.

III. EXAMPLE PROCESSES

Figure 5:
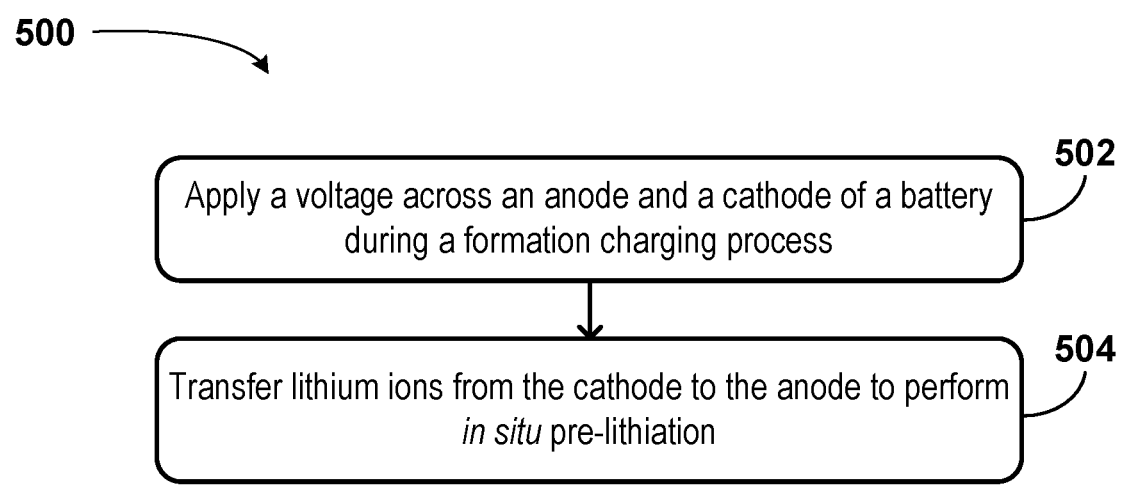
FIG. 5 is a flow chart illustrating a method, according to example embodiments.

FIG. 5 is a flow chart illustrating a method 500. The method 500 may be used to in situ pre-lithiate a battery (e.g., a rechargeable battery having a silicon anode), for example.

At block 502, the method 500 may include applying a voltage across an anode and a cathode of a battery during a formation charging process. In some embodiments, the voltage may be between 4.40 volts and 4.60 volts (e.g., 4.50 volts). Further, the cathode may include $LiCoO_2$. In addition, the anode may include silicon. If the battery is a rechargeable battery, the battery may be configured to be repeatedly charged to a voltage between 4.35 volts and 4.45 volts (e.g., 4.40 volts).

In some embodiments, the cathode may include a matrix of particles (e.g., powderized microparticles) chemically or otherwise bonded (e.g., annealed) with one another. Each particle may include a core region and a primary shell region that surround the core region. Further, each particle may include a secondary shell region, a tertiary shell region, and/or further shell regions, in various embodiments.

At block 504, the method 500 may include transferring lithium ions from the cathode to the anode to perform in situ pre-lithiation. In some embodiments, the ratio of a capacity of the anode to a capacity of the cathode may be less than 1.0. In various other embodiments, the ratio of the capacity of the anode to the capacity of the cathode may be 0.999, 0.99, 0.98, 0.97, 0.96, 0.95, 0.9, 0.85, 0.8, 0.75, or 0.7. Other ratios are also possible.

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. A battery, comprising:
    a cathode,
    wherein the cathode comprises a matrix of particles bonded with one another, and
    wherein each particle comprises:

a core region comprising $LiNiCoAlO_2$ and $Li_2MnO_3$; and a primary shell region that surrounds the core region;

an anode; and a secondary shell region that surrounds the primary shell region, wherein the secondary shell region comprises $LiCoO_2$, $LiNiMnCoO_2$, $LiNiCoAlO_2$, and $Li_2MnO_3$.

2. The battery of claim 1, wherein the particles are spherical.

3. The battery of claim 2, wherein a ratio of a radius of the core region to a thickness of the primary shell region is between 0.1 and 0.5.

4. The battery of claim 1, wherein the anode comprises Si.

5. The battery of claim 1,
wherein the battery is configured to be charged during a formation charging process by applying a voltage between the cathode and the anode, and
wherein the voltage is between 4.45 volts and 4.50 volts.

6. The battery of claim 1, wherein the battery is a rechargeable battery configured to be repeatedly recharged to a voltage between 4.15 volts and 4.25 volts.

7. The battery of claim 1,
wherein the battery is configured to be charged during a first formation charging process by applying a voltage between the cathode and the anode, and
wherein the voltage is between 4.45 volts and 4.65 volts.

8. The battery of claim 1, further comprising:
a tertiary shell region that surrounds the secondary shell region, wherein the tertiary shell region comprises $LiCoO_2$ and $LiNiCoAlO_2$.

9. A battery, comprising:
a cathode,
wherein the cathode comprises a matrix of particles bonded with one another, and
wherein each particle comprises:
a core region; and
a primary shell region that surrounds the core region, wherein the primary shell region comprises $LiNiMnCoO_2$ and $Li_2MnO_3$;
an anode; and
a secondary shell region that surrounds the primary shell region, wherein the secondary shell region comprises $LiCoO_2$, $LiNiMnCoO_2$, $LiNiCoAlO_2$, and $Li_2MnO_3$.

10. The battery of claim 9, wherein the anode comprises Si.

11. The battery of claim 9, wherein the particles are spherical.

12. The battery of claim 9, further comprising:
a tertiary shell region that surrounds the secondary shell region, wherein the tertiary shell region comprises $LiNiMnCoO_2$, $Li_2MnO_3$, and $LiNiCoAlO_2$.

13. A battery, comprising:
a cathode,
wherein the cathode comprises a matrix of particles bonded with one another, and
wherein each particle comprises:
a core region comprising $LiNiCoAlO_2$ and $Li_2MnO_3$; and
a primary shell region that surrounds the core region, wherein the primary shell region comprises $LiNiMnCoO_2$ and $Li_2MnO_3$; and
an anode.

14. The battery of claim 13, further comprising a secondary shell region that surrounds the primary shell region, wherein the secondary shell region comprises $LiCoO_2$, $LiNiMnCoO_2$, $LiNiCoAlO_2$, and $Li_2MnO_3$.

15. The battery of claim 13, wherein the anode comprises Si.

16. The battery of claim 13, wherein a ratio of a radius of the core region to a thickness of the primary shell region is between 0.1 and 0.5.

17. The battery of claim 13, further comprising a secondary shell region that surrounds the primary shell region, wherein a ratio of a thickness of the primary shell region to a thickness of the secondary shell region is between 0.01 and 0.5.

18. The battery of claim 13, wherein the particles are spherical.

* * * * *